United States Patent [19]

Hofmann et al.

[11] Patent Number: 4,908,048
[45] Date of Patent: Mar. 13, 1990

[54] APPARATUS FOR DEGASSING LIQUIDS BY CENTRIFUGAL FORCE IN A FRUSTUM SHAPED BODY

[75] Inventors: Hans Hofmann, Cologne; Herbert Broerken, Solingen; Franz Hoffacker, Langenfeld, all of Fed. Rep. of Germany

[73] Assignee: Agfa-Gevaert Aktiengesellschaft, Leverkusen, Fed. Rep. of Germany

[21] Appl. No.: 563,550

[22] Filed: Dec. 21, 1983

Related U.S. Application Data

[63] Continuation of Ser. No. 348,512, Feb. 12, 1982, abandoned.

[30] Foreign Application Priority Data

Feb. 18, 1981 [DE] Fed. Rep. of Germany ....... 3105914

[51] Int. Cl.$^4$ ............................................. B01D 19/00
[52] U.S. Cl. ..................................... 55/193; 55/194; 55/203; 210/188
[58] Field of Search .................. 55/178, 189, 190, 194, 55/203, 204, 205, 192, 193; 210/188; 348/512

[56] References Cited

U.S. PATENT DOCUMENTS

| | | | |
|---|---|---|---|
| 3,161,593 | 12/1964 | Schiel | 55/205 X |
| 3,856,483 | 12/1974 | Rumpf et al. | 55/203 X |
| 3,928,003 | 12/1975 | Fryer | 55/190 X |
| 4,030,897 | 6/1977 | Pelzer et al. | 55/203 X |
| 4,365,977 | 12/1982 | Egbert | 55/203 X |

FOREIGN PATENT DOCUMENTS

| | | | |
|---|---|---|---|
| 2147124 | 3/1973 | Fed. Rep. of Germany | 55/203 |
| 138508 | 11/1979 | Fed. Rep. of Germany | 55/203 |
| 2008971 | 6/1979 | United Kingdom | 55/203 |

Primary Examiner—Richard V. Fisher
Attorney, Agent, or Firm—Connolly & Hutz

[57] ABSTRACT

The invention relates to a process and to an apparatus for carrying out the process for degassing of liquids at reduced pressure using a centrifugal force to produce a thin layer of liquid using a conical rotary body the interior of which is maintained at a reduced pressure and in which the liquid is conducted through a hollow shaft and is sprayed by means of a distributor to the conically widening internal surface of the rotary body into a thin film of liquid to be degassed and to flow to an annular collecting chamber from which the degassed liquid is conducted to the center of the centrifuge chamber and discharged from the rotary body against the reduced pressure through the hollow fixed shaft by means of a removal disc.

1 Claim, 3 Drawing Sheets

APPARATUS FOR DEGASSING LIQUIDS BY CENTRIFUGAL FORCE IN A FRUSTUM SHAPED BODY

CROSS REFERENCE

This application is a continuation of the co-pending application Ser. No. 348,512, filed Feb. 12, 1982 by Hans Hofmann et al entitled "Process for the Degassing of Liquids and Apparatus for Carrying out the Process." now abandoned.

This invention relates to a process for the degassing of liquids, in particular of suspensions and emulsions, at reduced pressure using a centrifugal force to produce a thin layer of liquid, and an apparatus for carrying out the process, consisting of a conical rotary body the interior of which is maintained at a reduced pressure, a feed and distributor device for the liquid to be degassed and a device for removing the degassed liquid and the gas.

Many products of the chemical, pharmaceutical, food stuffs and related industries, in particular highly viscous liquids, pastes, suspensions, emulsions or the like, contain air or gases dissolved in the form of small bubbles which are unavoidably incorporated in the liquid in the course of its preparation but which should not or must not be present in the end product. In photographic emulsions, for example, the presence of gas bubbles seriously impairs the quality of films or photographic papers prepared with these emulsions because the gas bubbles interfere with the volumetric flow at the coating devices and cause streaks which render the photographic materials unusable.

Processes for degassing liquids in a centrifuge, in which the liquid, in the form of a thin layer, is subjected to a radial acceleration which if possible acts on it vertically, at an ambient pressure above the vapour pressure of the liquid phase have been disclosed, for example, in DDR Pat. No. 138,508. In the centrifugal compartment which is at a reduced pressure, the gas bubbles in the liquid are subjected to an inwardly direction upthrust which carried them from the outside inwards. It has been found particularly advantageous to carry out degasification on a film flowing on the internal periphery of a centrifugal rotor. The main advantage of this method is that the pressure established in the liquid is only slightly in excess of the external pressure of the gas chamber which prevails on the surface of the film. This means that only a small quantity of gas remains dissolved in the liquid. In degassing centrifuges with a relatively high liquid level, such as are known from the Patent literature and employed in the art, this factor has apparently been left out of account, with the result that in particular in fine particles dissolve and form bubbles once more and are thereby left out of the degassing process.

German Pat. No. 2,147,124 discloses an apparatus for the degassing of liquids in which the liquid is treated in a centrifuge under vacuum and spreads out over the internal wall of the rotor of the centrifuge to form a flowing film which is subdivided into a portion with a low bubble content and a portion with a high bubble content. In order to separate the portion with the high bubble content from the portion with the low bubble content, an overflow element in the form of a blade, is situated at the point where the liquid is discharged from the rotor. Liquid rich in bubbles moves past one side of this overflow element to be returned to the rotor for treatment while liquid which is at a diminished circumferential velocity and should have a relatively low bubble content is removed from the other side. Although the liquid removed from the latter side has a lower bubble content then the liquid which is introduced into the rotor before it is subjected to degassing, it is not sufficiently free from bubbles. This is mainly attributable to the fact that the layer of liquid moving over the wall of the rotor still contains a substantial quantity of bubbles because the centrifugal forces are not sufficient to enable the bubbles to collect in that part of the liquid which is remote from the wall of the rotor. Furthermore, technical difficulties in the construction and operation of such an installation are, no doubt, also a reason why so far such an installation is not to be found on the market.

British published patent application GB A 2008971 discloses a process and an apparatus in which a liquid is subjected to a first low pressure degasification with a simultaneously supplied gas, and in a second phase, it is further degassed with a centrifugal rotor and collects as an annular layer of liquid in a pump portion and is discharged by centrifugal force against the reduced pressure in the system.

The apparatus and process have considerable disadvantages since liquid collects and flows between the centrifugal rotor and the walls of the housing and between the pump rotors and the walls where it is subjected to considerable shearing forces. Heat is therefore produced through friction which cannot be controlled. The heat produced leads to the formation of encrustations which, when they become detached, form lumps which cause even more serious problems in photographic emulsions than the bubbles. If heating is excessive, the quality of the photographic emulsions is seriously impaired. The discharge of the liquid at the circumference of the pump also gives rise to serious disturbances in the flow, which may cause renewed formation of bubbles.

It is an object of the present invention to provide a process and an apparatus of the type indicated above by means of which it should be easily possible to degas a liquid continuously and substantially completely and uniformly and to regulate the degree of degasification.

This problem is solved according to the invention in a process of the type indicated above by the following means:

(a) the liquid to be degassed is introduced into a rotary body through a hollow shaft and sprayed on to the surface of the rotary body, (b) the liquid is conducted from the distributor device to a conically widening internal surface of the rotary body and is spread out to form a thin film of liquid under a reduced pressure, and under the influence of the centrifugal force this film becomes even thinner on the widening conical surface of the rotary body, and becomes degassed and flows to an annular collecting chamber, and (c) the degassed liquid which is now free from bubbles, is conducted to the middle of the centrifuge chamber and is discharged from rotary body against the reduced pressure via a hollow fixed shaft.

The process according to the invention is surprisingly found to be highly efficient in degassing and avoids the disadvantages of the processes mentioned above. By spraying the liquid to be degassed from the central hollow shaft on to the rapidly rotating surface the liquid is split up into burst droplets in the first phase of degasification, and at the reduced pressure these already release a high proportion of the gas bubbles. By conducting the liquid to the conical surfaces in the rotary body, the liquid is transported by the centrifugal force, and the thickness of the liquid layer is further reduced so that even the smallest gas bubbles and dissolved gas leave along very short diffusion paths in the vacuum chamber and are discharged. Removal of the degasified liquid which is conducted to the middle of the centrifuge chamber and discharged through the fixed shaft is completely without problems and prevents the production of fresh bubbles.

An improvement of the process can be achieved by passing the liquid to be degassed over a sharp edged shutter or restrictor before its entry into the rotary body so that it undergoes a sudden change in pressure which effects preliminary degasification.

Due to the sudden reduction in pressure of the liquid at the sharp edged shutter or restrictor, part of the gas in the liquid is spontaneously released and forms bubbles which are also introduced into the process where they are immediately separated.

A first step of the process for the separation of gas and liquid in which the liquid introduced into the rotary body is sprayed on to the internal surface of a cylindrical rotating tube in the distributor apparatus and repeatedly stopped abruptly by distributors and separates from the surface and as thrown back on the surface, is found to be particularly advantageous for separating the gas and liquid.

The frequent spraying of the liquid in the distributor device so that parts of the liquid are separated from the rotating tube and cover flight path at reduced pressure as droplets or a mist, enables degassing to be achieved with considerable success even in this first stage.

After degassing the liquid, it is particularly important to find a method for removing the liquid from the centrifuge chamber without disturbing it so that no bubbles are formed. One method which has been found particularly suitable for this purpose is characterised by the fact that the liquid is removed from the annular collecting chamber by means of a fixed removal disc below the surface of the liquid ring in the annular collecting chamber.

It is surprisingly found that when liquid which is hyposaturated with gas, is removed by a removal disc which dips into the rotating liquid ring, no eddies which are liable to form gas bubbles are produced. Inspite of the considerable pressure of the rapidly rotating liquid against the streamlined disc and the aperture for removal in the removal disc, the liquid becomes markedly pacified. The further the liquid ring rises to the centre of the centrifuge, the higher becomes the pressure acting radially outwards and the flow lines in the immediate vicinity of the point of removal become correspondingly calmer.

The degassed liquid is advantageously carried from the space in the conical rotary body to the annular collecting chamber through a perforated disc which rotates with the rotary body.

The liquid film which is accelerated in the axial direction by the conical rotary body is thereby slowed down and placed uniformly on the liquid ring without striking forcefully against the removal discs to produce eddy currents.

In a particularly advantageous method, the thickness of the liquid ring at constant liquid discharge rate to the rotary body is maintained constant by adjusting the volumetric flow rate at the inflow valve.

A uniform rate of degassing and uniform dwell time for the liquid are thereby achieved in the process.

Regulation of the volumetric flow rate at the inflow valve can be achieved by various methods.

For optical determination of the thickness of the liquid ring, an inspection window is provided in the centrifuge housing and this window is flashed using a stroboscope which is synchronous with the speed of rotation of the housing so that the liquid level under the inspection window becomes visible once with each rotation. The thickness of the liquid ring can thus be determined optically and the outflow valve can be adjusted manually or by an automatic adjustment so that the thickness of the liquid ring is maintained constant.

Another method is characterised by the fact that the pressure exerted by the liquid ring against the internal surface of the rotary body is measured and used as a valve for regulating the outflow rate. The pressure exerted against the internal surface of the rotary body by the rotating liquid ring is dependent upon the following parameters:

(a) the density of the liquid,
(b) the speed of rotation of the rotary body and
(c) the difference between the external and internal diameter of the liquid ring.

When (a) and (b) are kept constant, a change in the height of the liquid produces a pressure change which is used as regulating factor.

In another method, the friction of the rotating liquid ring against the fixed removal disc is measured and used as a valve for regulating the outflow. The friction produces a loss in output which is converted into heat. If the speed of rotation is to be maintained constant, the driving power of the motor must be increased. The loss in output is in this case dependent upon the size of the shearing surface and hence on the thickness of the liquid ring and on its viscosity. If the viscosity is kept constant, as is usually the case, the increase in output of the motor may be used as controlling factor to regulate the volumetric flow rate at the outflow.

Torsion measurements are employed in another method. In this case, the removal disc is mounted elastically and the deflection of the disc by the thickness of the liquid ring is used to regulate the outflow; alternatively, a conductivity measurement is used, in which case the thickness of the liquid ring is determined by conductivity sensors and the value measured is used to regulate the outflow.

One method which is particularly advantageous for liquids which are highly sensitive to temperature or which reach a state of optimum degasification at a certain temperature is characterised by the fact that the temperature of the liquid to be degassed is controlled from outside by heating or cooling of the rotary body while the liquid spreads out over the internal wall of the rotary body.

Heating of the liquid may occur, for example, due to liquid friction in the apparatus. This heating depends on the viscosity, the thickness of the liquid ring, the volumetric throughout and the surface geometry of the removal disc. Such heating is particularly undesirable in photographic emulsions.

The spreading out of the emulsion in the conical rotary body to form a thin film may be used very successfully to achieve intensive heat exchange. For example, the rotary body may be equipped with cooling ribs and cooled by the surrounding air. It is more advantageous, however, to spray the external surface of the rotary body with a cooling liquid. Very accurate temperature control may then be achieved by regulating the quantity of cooling fluid. The device can be provided with a jacket through which the cooling or heating liquid is guided along the conical body.

In an apparatus for carrying out the process of the type indicated above, the problem is solved according to the invention by the following means:

(a) a conical rotary body of rotation is mounted to be rotatable on a fixed shaft and driven from outside, (b) the fixed shaft is made hollow for the inflow of the liquid to be degassed and is provided with at least one inflow aperture or nozzle for injection of the liquid into inside space of the rotary body, (c) a distributor device for the injected liquid is provided in the rotary body and rotates with it, (d) an annular collecting chamber for the degassed liquid is provided at the wide end of the conical rotary body, (e) a removal disc having a tangential recess and an aperture is attached to the fixed shaft and extends into the annular collecting chamber for removal of the degassed liquid, (f) the fixed shaft is provided with a discharge aperture through which the degassed liquid may be carried away from the removal disc and discharged from the inside of the rotary body and, (g) the fixed shaft has another aperture through which gas may be removed and the chamber in the rotary body may be brought to reduced pressure.

The apparatus is surprisingly found to provide considerable advantage over those known in the art. The fixed hollow shaft enables the liquid to be degassed to be easily supplied and removed. The reduced pressure may equally well be produced and maintained by an aperture in the rotating centrifuge chamber so that the rotary body may rotate freely on the fixed shaft. Sedimentation of solid particles and excessive heating due to shearing stresses do not occur. The seals of the rotating body are not touched by the liquid to be degassed and when the degassed liquid is removed from the vacuum chamber no new bubbles are formed which could cause trouble in the subsequent treatment.

A first degasification is obtained by providing a distributor device in the centrifuge chamber so that the liquid is sprayed on to the rotating surfaces of the distributor device and during the time of fall of the liquid the bubbles increase in volume and therefore burst due to the reduced pressure.

The conical internal surface of the rotating body, with its progressively increasing diameter, at the same time causes a reduction in the thickness of the layer and hence further degasification of the liquid film and transport of the liquid to an annular collecting chamber.

Removal of the degassed liquid from the rotary body which is at a reduced pressure is very problematical in all low pressure-centrifuge degasifiers. In the present apparatus, this problem was solved in the best possible and surprisingly simple manner by attaching a removal disc whose outer edge dips into the liquid ring to the fixed shaft. The disc is so formed that on the one hand it produces a localized excess pressure in the liquid ring, causing the liquid to flow into an aperture in the disc which communicates with the hollow shaft, and on the other hand it does not disturb the remaining flow in the annular surface sufficiently to cause the formation of any eddy currents or bubbles.

In one embodiment of the apparatus, the distributor device consists of at least two conical tubes which rotate with the rotary body. The liquid is sprayed from at least one aperture in the fixed shaft on to an inner conical tube, undergoes axial and radial acceleration, is sprayed on to a second conical tube and accelerated axially and is then sprayed on to the conical surface proper of the rotary body of the centrifuge and is again accelerated axially to be spread out into a very thin film, whereby excellent degasification is achieved.

In one particular embodiment of the apparatus, the distributor device consists of a cylindrical and a conical tube, and distributors are attached to the fixed shaft to interrupt the flow of the liquid sprayed on the cylindrical tube. The fixed distributors, which extend close to the cylindrical internal wall of the tube, advantageously spray the liquid into the cylindrical chamber and atomize it so that gas bubbles and dissolved gas can easily leave to enter the vacuum chamber. The liquid thus becomes hyposaturated with gas so that no gas bubbles are formed even after the liquid is discharged from the apparatus.

Uniform and untroubled distribution of the degassed liquid in the annular chamber is advantageously achieved by providing a perforated disc at the wide end of the conical rotary body to rotate with this rotary body. This perforated disc reduces the axial velocity of the liquid due to centrifugal force and prevents the formation of eddy currents.

In a particular embodiment of the apparatus, the removal disc is streamlined, at least in the region where it dips into the annular collecting chamber, so that it does not disturb the flow of liquid. This measure considerably reduces heating of the liquid by friction acting on the disc and prevents the formation of eddies or streams which could give rise to the formation of bubbles.

While the apparatus is in operation, the thickness of the liquid ring should, as far as possible, remain. This is achieved by providing an inflow valve at the inflow side of the apparatus, by which the inflow rate may be kept constant by controlling the valve manually or automatically in dependence upon the thickness (d) of the ring of liquid.

An embodiment of the invention is described in more detail below with reference to the drawings, in which.

Figure 1:
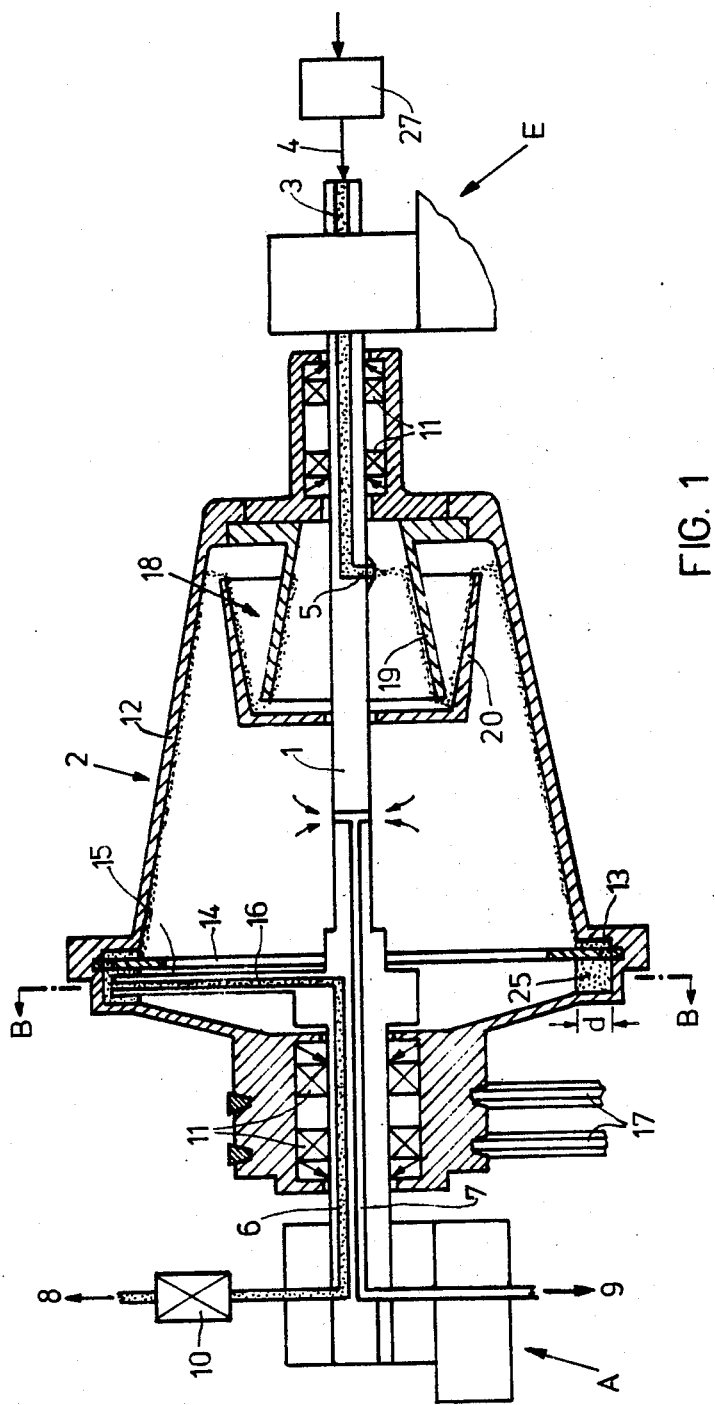
FIG. 1 shows an apparatus for degassing liquids by centrifugal force at reduced pressure.

The apparatus as shown in FIG. 1 consists of a fixed shaft 1 which is mounted at its ends and on which a rotary body 2 is freely rotatable. A fixed shaft 1 has an axial bore 3 at its inlet end E, through which the liquid 4 to be degassed is introduced into the rotary body in the direction of the arrow. The bore ends in the rotary body in at least one radial bore 5, to distribute the liquid 4 in the interior of the rotary body 2.

One or more radical bores 5 may be provided and the bores 5 may also be equipped with nozzles to spray the liquid 4 which is to be degassed.

The fixed shaft 1 has two bores 6, 7 at the outlet end A. The bore 6 serves to discharge the degassed liquid 8 and the bore 7 serves to suck air and gas 9 out of the interior of the rotary body 2 to produce and maintain a reduced pressure therein. The air or gas 9 is removed in the direction of the arrow, using a vacuum pump in the usual manner. The degassed liquid 8 is carried to the outside through the bore 6 by the flow pressure produced by the centrifugal forces.

The rotary body 2 is rotatably mounted at the inlet end E of the fixed shaft 1 and sealed by seals 11. It has a conical surface 12 which increases in width in the direction of the outflow end A and ends in an annular collecting chamber 13 to collect the degassed liquid 8 in a liquid ring 25.

A perforated disc 14 which rotates with the rotary body 2 is arranged in the collecting chamber 13. Its function is to slow down the liquid film which is accelerated axially by centrifugal force and to distribute the film uniformly over the liquid ring 25 in the collecting chamber 13. A fixed disc 15 in the form of a circular segment, extends into the annular collecting chamber 13. This disc 15 is attached to the fixed shaft 1 and has a bore 16 with which is connects the collecting chamber 13 with the bore 6 of the shaft so that liquid can be carried out of the collecting chamber 13 of the rotary body 2. The rotary body 2 is rotatably mounted at its outlet end A where it is sealed-off by seals 11, and it is driven by a device 16. It may be driven by various means, such as gear wheels, friction wheels, sprocket belts or cone belts. The simplest method of driving, which is illustrated here, is that using cone belts 17 driven by a motor (not shown). The motor is advantageously designed so that a desired speed of rotation adapted to the particular problem of degasification, may be selected and maintained constant.

Satisfactory degasification of the liquid 4 is obtained simply by spraying the liquid directly on to the conical internal surfaces 12 of the rotary body 2, but it has been found advantageous to arrange a distributor device 18 at the inlet end E of the rotary body to rotate with this body. Degasification of the liquid 4 is thereby considerably improved.

The distributor device 18 illustrated in FIG. 1 consists of tubes 19, 20 which widen out conically. These tubes deflect the liquid twice and carry it to the beginning of the conical internal surface 12 of the rotary body 2.

Figure 2:
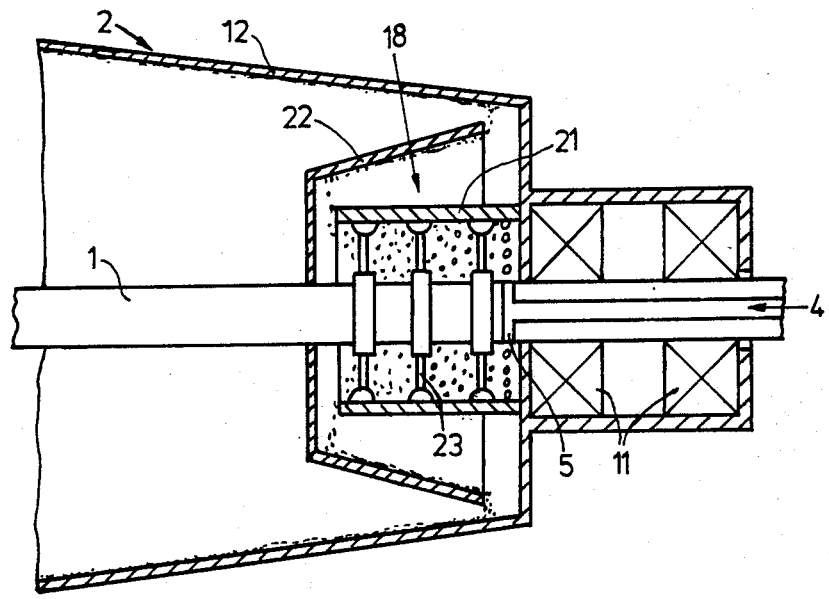
FIG. 2 shows another embodiment of a distributor device of the apparatus of FIG. 1.

The distributor device 18 illustrated in FIG. 2 consists of a cylindrical tube 21 rotating with the rotary body 2 and a conical tube 22 also rotating with the body 2. A plurality of distributors 23 arranged on the fixed shaft 1 almost touch the rotating cylindrical tube 21 and thus disturb the liquid film on to the internal wall of the cylindrical tube 21. The conical tube 22 conducts the liquid to the beginning of the conical internal surface 12 of the rotary body 2.

The invention relates in the same manner to a device in which the rotary body 2 is only pivoted on on one side of the fixed shaft 1, i.e. on the side A of FIG. 1. The fixed shaft 1 has then a supplementary bore to deliver the liquid to be degassed into the rotary body. (not shown)

Figure 3:
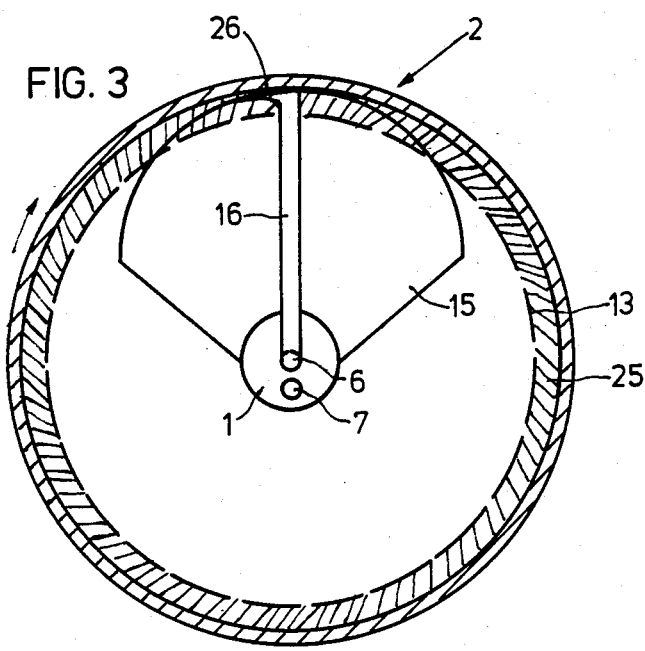
FIG. 3 is a section through a collecting chamber for degassed liquid taken on the line B—B (FIG. 1)

FIG. 3 illustrates the removal disc 15 for the removal of degasified liquid from the liquid ring 25 in the collecting chamber 13. The removal disc 15 is attached to the fixed shaft 1 and its circumference extends into the collecting chamber 13. The circumference of the removal disc 15 is formed in such a manner that the collecting chamber 13 is progressively reduced in width and a high static pressure is produced in the rapidly rotating liquid in the collecting chamber 13. At the point where it dips into the liquid ring 25, the removal disc 15 is streamlined with a sharp edge 24 (FIG. 5) to produce as little disturbance as possible in the flow of liquid 8 and avoid friction. Below the surface of the liquid ring 25, the removal disc has a tangential groove 26 widening out in the direction of flow and leading to the bore 16 in the removal disc 15. This groove 26 pushes the liquid which is under a high pressure into the removal bore 16 to discharge it against the reduced pressure existing in the rotary body.

Figure 4:
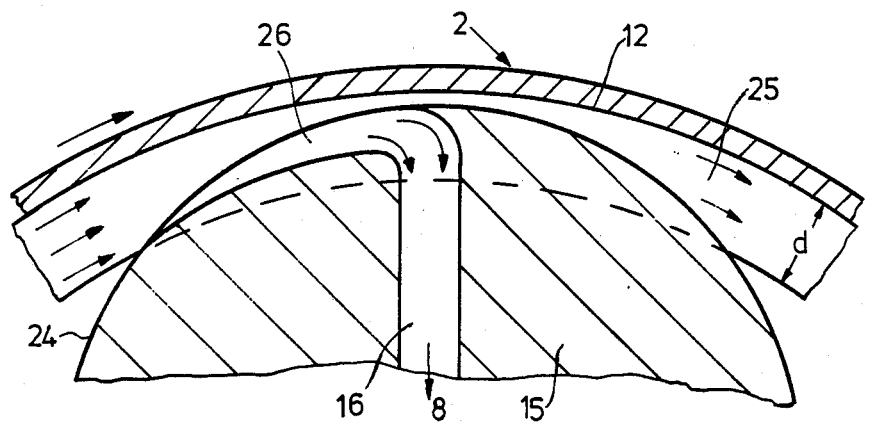
FIG. 4 is an enlarged view of a removal disc of FIG. 3.

FIG. 4 shows an enlarged view of the removal disc 15. The sharp edge 24 of the disc 15 dips into the liquid ring 25 and takes up the liquid 8 with its tangential groove 26 and forces it through the bore 16 to the centre of the rotary body.

Figure 5:
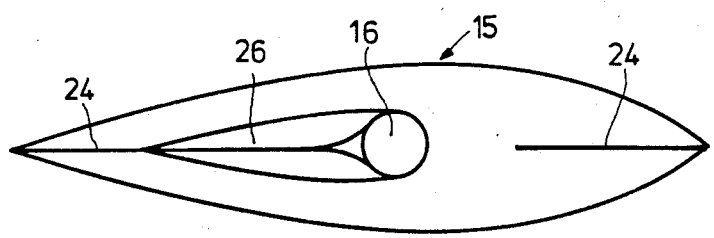
FIG. 5 is a top plan view of a removal disc of FIG. 4.

FIG. 5 gives a top plan view of the circumference of the removal disc 15 with the sharp edge 24, tangential groove 26 and removal bore 16.

Description of operation:

The liquid 4 to be degassed is delivered to the apparatus by a pump or by means of the vacuum in the rotary body 2 and is introduced into the hollow shaft 1. A device having a restrictor or a sharp edged shutter 27 may advantageously be arranged before the inlet into the apparatus. The liquid 4 to be degassed is thereby subjected to a sudden pressure change so that gas bubbles form in the liquid, which are immediately removed on entering the vacuum chamber of the rotary body.

The liquid 4 contains the minutest solid particles which bind residues of gas in gaps or on their surface, which may be regarded as degasification nuclei. If one considers the liquid 4 to be degassed, it should first be assumed that equilibrium exists between the degasification nuclei, the gas bubbles and gas dissolved in the liquid 4. The removal of large gas bubbles does not cause any particular difficulty since these ascend at a sufficiently high velocity due to their relatively large diameter and may be removed by a sudden pressure change behind a restrictor or shutter 27 or in a vacuum chamber. However, since the undissolved portion of gas in the form of bubbles, amounts to only approximately 2 to 5% of the total quantity of dissolved gas, depending on the temperature, pressure, viscosity and surface tension of the liquid, it is not sufficient to remove only this portion of the gas. Minute changes in pressure or temperature may disturb the equilibrium so that the dissolved gas may diffuse into the microscopically small degasification nuclei still present and cause these to grow into bubbles which may give rise to disturbances when the liquids are applied as coatings.

Whereas it is relatively simple to maintain constancy of temperature when transporting liquids 4, fluctuations in pressure are often unavoidable, particularly when there is a change in the cross section of flow through valves, pumps and sharp edged passages. Since such installations are often essential, trouble arises when a liquid saturated with gas flows through them because it forms bubbles. To prevent this, the liquid 4 must be sufficiently hyposaturated so that no bubbles will be produced either through temperature differences or through pressure differences. In a preliminary phase of the degasification process, device 27 described above is deliberately employed in such a manner that a sharp edge restrictor or shutter is situated upstream of the degasification unit 2 proper. The ratio of flow velocity to the cross section of flow must be adjusted to produce a spontaneous change in pressure which causes the liquid 4 flowing through the cross section to become suddenly super-saturated so that very many gas bubbles are formed spontaneously. The liquid-gas mixture is then carried forward to the apparatus proper. During the transport of liquid part of the dissolved gas is liable to diffuse into the resulting gas bubbles due to the shortened paths of diffusion.

The liquid 4 or liquid-gas mixture introduced into the apparatus is deflected inside the hollow shaft 1 towards the openings 5 and sprays radially on to the distributor device 18 (FIG. 1). On the first conical tube 19, the liquid 4 is accelerated to the circumferential velocity of the tube 19 rotating with the rotary body 2 and is at the same time accelerated towards the widening cone by centrifugal forces. At the end of the first tube 19, the liquid is sprayed on to the second tube 20 and conducted to the beginning of the conical internal surface 12 of the rotary body 2 and sprayed on to this surface.

During the periods of fall, the majority of the bubbles hitherto formed, are burst by their increase in volume in the vacuum chamber. The liquid 4 touches the rotating surface, is intensely accelerated on this surface and attains the same circumferential velocity as the surface after a brief travelling time. A more of less thick film is formed, according to the viscosity of the liquid 4, and this film travels along the conical surfaces and becomes progressively thinner due to the increase in diameter, and reaches the beginning of the conical internal surface 12 of the rotary body.

In the distributor device 18 of FIG. 2, The liquid 4 to be degassed is sprayed on to a rotating cylindrical tube 21 and accelerated to the circumferential velocity of the tube 21. The accelerated film of liquid is abruptly slowed down by fixed distributors 23, with the result that a liquid mist and minute droplets are formed. After a certain time in flight, the droplets again encounter the rotating surface and are accelerated, slowed down and so on until the droplets finally reach the edge of the tube 21 and encounter a conical tube 22 and drip from there on to the rotary body 2 while the following film becomes thinner.

The main degasification of the liquid finally takes place on the conical internal surface 12 of the rotary body 2 under reduced pressure and at a progressively increasing centrifugal force and progressive reduction in the thickness of the liquid film.

Since the layer of film becomes very thin, the path of diffusion for dissolved gas is very short in the vacuum chamber as is also the height which any gas bubbles still present must ascent. During this phase, the degree of degasification, i.e. the extent to which the liquid is hyposaturated and the separation of bubbles, is mainly determined by the thickness of the film and the length of films travelling time.

The direction of flow of the liquid film is towards the increasing radius, and the flow velocity is determined by the cone angle, the viscosity, the rate of through put and the centrifugal force.

At the end of the conical surface 12 of the rotary body 2, the thin liquid film hyposaturated with gas encounters a perforated disc 14 which rotates with the body 2, and is slowed down in its axial velocity and placed on a liquid ring 25 in the collecting chamber 13 without any eddy current formation. The liquid ring 25 may have, for example, a radical thickness d of 10 to 20 mm. The fixed removal disc 15 in the form of a circular segment dips with its sharp edge 24 into this liquid ring 25 through the surface of the liquid. Due to its streamlined shape, this edge does not substantially interfere with the flow of liquid, so that heating of the liquid by friction is reduced.

By optimizing the removal disc 15 in a tested apparatus, the temperature difference between inlet E and outlet A at a throughput of 4.5 liters per minute and a viscosity of 20 mPas, for example, could be reduced from 9° C. to 4.5° C., in othe words to half. At a higher rate of throughput, the temperature difference was less since the dwell time of any given particle of liquid in the collecting chamber 13 becomes shorter.

The removal disc 15 removes from the liquid ring 25 part of the liquid flowing past it and takes it up into a tangential groove 26. Due to its kinetic energy of rotation in the collecting chamber 13, the degassed liquid 8 is at a high pressure compared with that of the fixed removal disc and is therefore forced into the bore 16 of the removal disc 15 inspite of the vacuum in the rotary body 2, and is forced outwards through the bore 6 of the fixed shaft 1, which bore communicates with the bore 16.

When the flow out of the apparatus is continuous, the rotary body 2 rotates at a continuous rate and the viscosity of the liquid 4 is constant, the degree of degasification of the liquid 8 is adjusted by regulating the volumetric flow rate by means of the control valve 10. The parameter employed for adjusting the valve 10 is the thickness d of the liquid ring 25.

The degree of degasification may also be determined continuously or intermittently by some other method and used for optimum adjustment of the degasification plant. Measurement of the oxygen content with measuring electrodes before and after degasification is particularly suitable for this purpose, the degree of degasification being determined from the difference in the oxygen contents. Measurement of the oxygen content gives a direct indication of the total concentration of dissolved air (oxygen+nitrogen=99% of total air). The errors introduced by certain foreign gases are to a large extent eliminated by difference formation of the measured values at the inlet and outlet of the apparatus.

EXAMPLES

An exemplary embodiment of an apparatus according to FIG. 1 was put into operation. The limiting values of the apparatus were as follows:
Viscosity of the liquids: 1 to 1,000 mPas
Liquid throughput: 1-12 l/min.
Speed of rotation of the rotary body: 1,000 to 3,000 revs/min
Minimum outlet gas concentration: 8% of the saturation concentration.

EXAMPLE 1

A photographic emulsion was degassed before its introduction into a casting apparatus in order to prevent bubbles during casting.
Viscosity of the emulsion: 200 mPa.s
Liquid throughput: 6 l/min
Inlet temperature: 40° C.
Outlet temperature: 44° C.
Oxygen concentration at inlet: 6.5 mg/l of $O_2$
Oxygen concentration at outlet: 1.3 mg/l of $O_2$
Degasification ratio: 5

Speed of rotation: 3,000 per min
Vacuum: 0.08 bar abs.
Outlet pressure of liquid: 4.5 bar

EXAMPLE 2

Another photographic emulsion was degasified, and this time the rotary body 2 was cooled with water at 12° C.

Viscosity: 25 mPa.s
Liquid throughput: 4 l/min
Inlet temperature=outlet temperature: 40° C.
Oxygen concentration at inlet: 6.2 mg/l of $O_2$
Oxygen concentration at outlet: 0.8 mg/l of $O_2$
Degasification ratio: 7.75
Speed of rotation: 3,000 per min
Vacuum: 0.08 bar abs.
Outlet pressure of liquid: 4.8 bar

EXAMPLE 3

The photographic emulsion was degassed as in Example 2 but using an apparatus which was equipped with a distributor device according to FIG. 2. The following values were different from those of Example 2:

Oxygen concentration at inlet: 6.2 mg/l of $O_2$
Oxygen concentration at outlet: 0.6 mg/l $O_2$
Degasification ratio: 10.33
Outlet pressure of liquid: 4.4 bar

EXAMPLE 4

When a restrictor or shutter 27 with sharp edges was installed upstream of the apparatus, the degasification ratio could be improved to 12, and the outlet pressure of the liquid fell only slightly 4.2 bar.

We claim:

1. In an apparatus for degassification of liquids having a rotatable body for receiving a liquid mounted around a fixed shaft having an internal passage for introducing the liquid into the body and associated with an annular chamber for collecting the liquid, the novel combination of improvements in degassification of liquid suspensions and emulsions at reduced pressure being, a rotatable body consisting of a frustum of a cone which is defined at a first end by a first base plane surface intersecting the axis of the body and at the opposite and second end by a second plane surface intersecting the axis of the body and of a lesser area than said first base plane surface, said rotatable body being mounted around a fixed axially extending shaft, and enclosing an interior of the body of progressively increasing diameter from the second plane surface to the first base plane surface and having an internal wall surface adapted to receive the liquid radially injectable to the wall surface from the shaft under reduced pressure, a passage in the shaft positioned at the second end of the body and adapted to introduce the liquid via said passage into the rotatable body, means positioned adjacent the second plane surface for the passage of the liquid from the passage in said shaft to the internal wall surface, including means to apply the liquid onto a surface which rotates and for effecting a change of pressure on the liquid within a limited period of time to at least partially degassify the liquid, in passing to the internal wall surface, said means consisting of a sharp edged shutter adapted to restrict the liquid to be degassed, said body and fixed shaft being so constructed and arranged that the liquid is receive on the internal wall surface of the rotatable body and the body is adapted to spread the liquid out under a reduced pressure so that the liquid forming a thin film on the internal surface under the influence of the centrifugal force may become even thinner on the internal wall surface and is degassed, and being adapted to move the liquid under centrifugal force radially and axially along the internal wall surface at an acceleratable rate to an annular collecting chamber for collecting degassed liquid from the wall surface adjacent the first base plane surface, and associated with said collecting chamber, recessed means extending into the collecting chamber for removing the degassed liquid, whereby degassed liquid is drawn out of the apparatus against the reduced pressure in the body interior.

* * * * *